Dec. 8, 1959   R. J. THOMAS ET AL   2,916,312
OIL-AND-VAPOR SHAFT-SEAL
Filed July 1, 1957   2 Sheets-Sheet 1
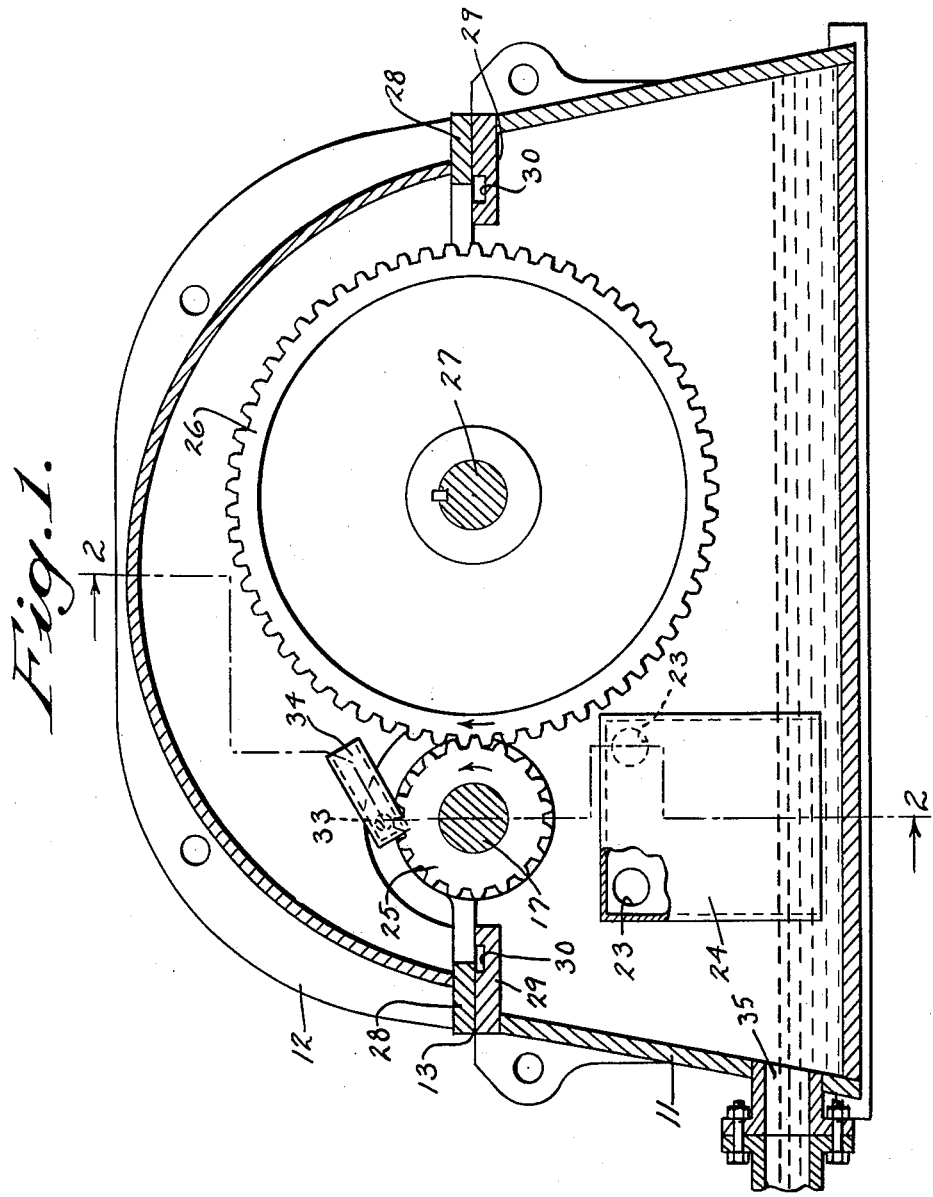
INVENTORS,
RICHARD J. THOMAS
DONALD J. FEILBACH
BY Quarles, Fox, Seidel,
Bateman & Hoar
ATTORNEYS Dec. 8, 1959 — R. J. THOMAS ET AL — 2,916,312
OIL-AND-VAPOR SHAFT-SEAL
Filed July 1, 1957 — 2 Sheets-Sheet 2

INVENTORS,
RICHARD J. THOMAS
DONALD J. FEILBACH

BY Juarles, Fox, Seidel, Bateman & Hoar

ATTORNEYS

United States Patent Office 2,916,312
Patented Dec. 8, 1959

2,916,312

OIL-AND-VAPOR SHAFT-SEAL

Richard John Thomas, Fox Point, and Donald John Feilbach, Milwaukee, Wis., assignors to The Falk Corporation, Milwaukee, Wis., a corporation of Wisconsin Application July 1, 1957, Serial No. 669,356

3 Claims. (Cl. 286—5)

This invention relates to an oil-and-vapor shaft-seal, and more particularly to mechanism for preventing the escape of vaporized lubricating oil from the housings of power transmission gear units which have rotating shafts extending from the housings.

In such a unit the rapid rotation of certain gears is apt to churn-up some of the lubricant into a vapor, which then breathes out around the high and low speed shafts, more particularly the former, and then congeals on the outside of the housing and of adjacent objects, producing a messy condition similar to that which would be caused by an oil-leak. Conventional oil-seals have proved ineffective to prevent this escape of vaporized oil, and can even be improved upon in preventing the escape of oil.

Accordingly the principal object of the present invention is to produce a modification of the conventional gear housing, whereby even a conventional oil-seal will prevent the escape of oil vapors from the gear housing.

Other objects and advantages will appear in the description which follows.

In the description, reference is made to the accompanying drawings, forming a part hereof, in which there are shown, by way of illustration and not of limitation, a certain specific form in which the article of manufacture of the present invention may be embodied.

In the drawings:

Fig. 1 is a vertical section of part of one wall of the housing and associated parts, of the present invention, as viewed from the line 1—1 of Fig. 2.

Figure 3:
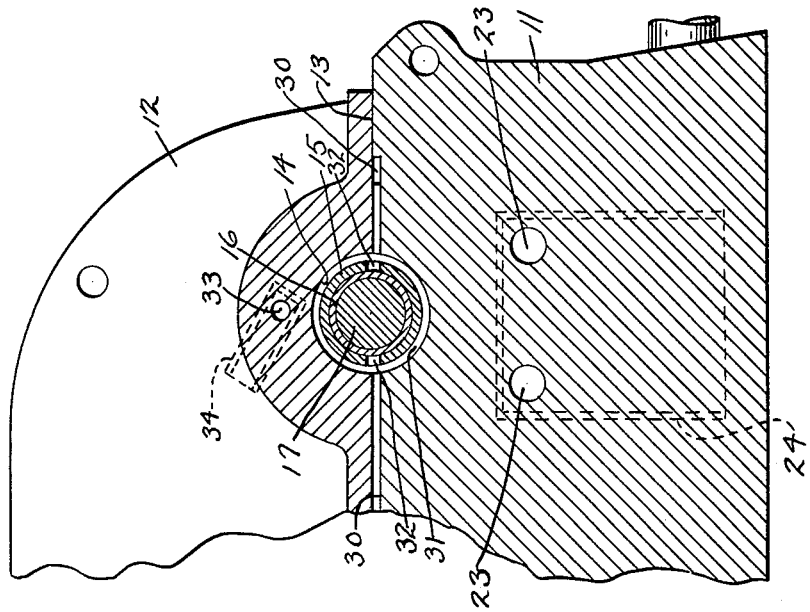
Fig. 3 is a vertical section, partly in elevation, as viewed from the line 3—3 of Fig. 2.
Figure 2:
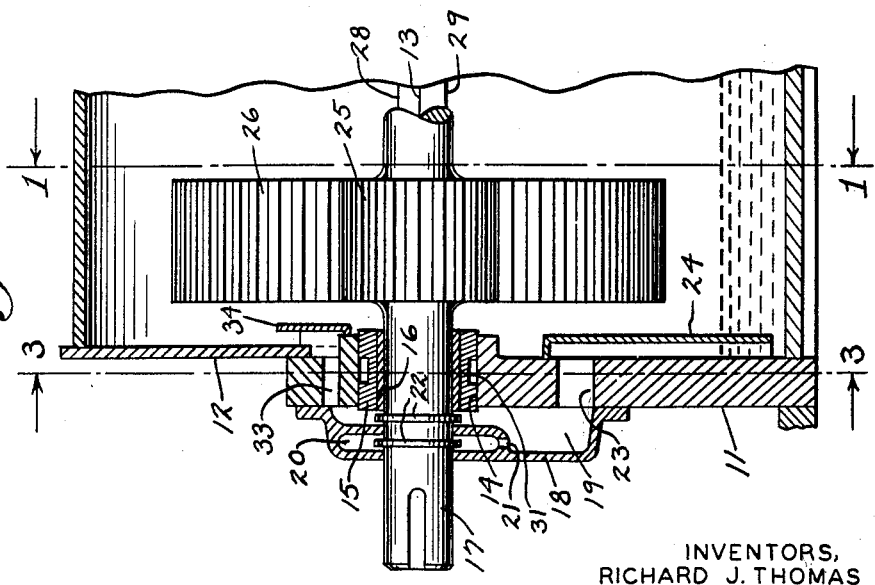
Fig. 2 is a vertical section, as viewed from the line 2—2 of Fig. 1.

Throughout the description, the same reference-numeral is applied to the same member or similar members.

Referring now to the drawings, it will be seen that 11 is the base of the housing and 12 is the cover of the housing, joining each other along a horizontal split 13.

In a large hole 14 in the housing there fits a bearing-cage 15, containing a babbitt bearing 16, in which high speed shaft 17 is journaled. Closely surrounding this shaft, with running clearance, is oil-retainer 18, which is secured to the outer face of the housing in any convenient manner; and which, for ease in assembling may be horizontally split into two parts, corresponding to the two parts 11 and 12 of the housing.

Oil-retainer 18 is shown enclosing two oil-seal chambers: inner 19, and outer 20; but might have more or less than two, without departing from the spirit of the present invention. In fact, the exact details of the oil-seal are relatively immaterial to the present invention.

Oil collecting in outer chamber 20, drains into inner chamber 19 through hole 21. Annular ridges 22 on shaft 17 project into chambers 19 and 20, to cause any outwardly leaking oil or vapor to take a circuitous course, and augment the tendency of the rotation of the shaft to throw off the oil centrifugally into the two chambers.

Oil collecting in inner chamber 19, drains back into the housing through holes 23, and trap 24. Oil collecting in the bottom of the housing, seals he open end of trap 24, and finally drains out through drain-pipe 35, which also serves to carny-off such vapor as does not congeal within the housing.

Shaft 17 carries pinion 25 integral therewith, and this pinion meshes with gear 26, keyed to low speed shaft 27, which is journaled in the housing in any convenient manner. Arrows in Fig. 1 indicate that the mesh of these two gears is moving upward. The significance of this fact will be alluded to, later herein. Additional or alternative gears and shafts may be provided without departing from the spirit of the present invention.

At the juncture 13 of the base and cover of the housing, there are two adjoining flanges. The upper flange 28 is a part of cover 12, and the lower flange 29 is a part of base 11.

Lower flange 29 carries an oil trough 30, which extends completely around the housing, except where interrupted by bearings, at which the trough communicates with annular passage 31 on the periphery of bearing cage 15, and thence through radial holes 32 to bearing 16.

On two of the faces of the housing, as shown at the side of Fig. 1, trough 30 is open. On the faces which contain bearings, trough 30 is closed by upper flange 28. The object of this trough is to collect oil which gathers on the inside of cover 12 of the housing, and feed this oil to the bearings, by gravity flow; also to provide an oil-passage readily accessible for cleaning; as to which objects see U.S. Patent No. 1,704,298, to Levine.

Additional oil can be fed-in to trough 30 from an outside source. The gears themselves may be lubricated by maintaining the oil in the base of the housing at a higher level than as shown, or oil may be sprayed onto the gears, both being well-known expedients.

It is a discovery of the present invention that there exist, within the housing of a high-speed gear unit, zones of materially different air-pressure. Thus it has been found that a gear rotating at high pitch-line velocity tends to create a zone of reduced pressure within the gear's rim. Also that the action of the gear mesh is to create a zone of increased pressure where the teeth come together, and a zone of reduced pressure where the teeth disengage. The two reducing tendencies combine to create a reduced pressure (quite appreciably below atmospheric) above the mesh on the common tangent of the two gears in Fig. 1. This phenomenon the present invention utilizes as follows.

Inner oil-seal chamber 19 is ducted into the housing by a conduit consisting of hole 33 in the face of cover 12, and passage 34 built onto the inside of the cover; and the open end of passage 34 is located in the just-described zone of low pressure. This sets up a pressure-differential between atmospheric pressure where shaft 17 emerges from retainer 18, and less-than-atmospheric pressure at the open end of passage 34; which differential is sufficient to blow back into the housing all oil-vapor which may leak-out around shaft 17, or which may form within oil-seal chambers 19 and 20.

Trap 24 prevents oil-vapor from escaping into and through the oil-seal, which would undo the effect of the just described pressure-differential.

And drain-pipe 35 leads off oil-vapor from the housing, and relieves build-up of pressure within the housing, which would prevent the establishing of the above mentioned pressure-differential.

It will be readily evident from the foregoing description that the present invention affords a novel and useful mechanism for preventing the escape of vaporized lubricating oil from the housings of power-transmission gear units which have rotating shafts extending from the housings.

It should be understood that the invention could likewise be employed with respect to other shafts which protrude from the housing.

Now that one embodiment of the invention has been shown and described, it is to be understood that the invention is not to be limited to the specific form or arrangement of parts herein shown and described.

What is claimed is:

1. An oil-and-vapor shaft-seal for preventing the escape of vaporized lubricating oil from the housing of a power-transmission gear unit, the combination, with the housing and a shaft journaled therein and projecting therefrom, comprising: an oil-seal surrounding the projecting portion of the shaft, said oil-seal including at least one chamber surrounding and open to the projecting portion of the shaft; first conduit means, extending from the upper part of the oil-seal to a point within the housing which point lies in a zone of lower than atmospheric pressure, for conveying from the oil-seal to within the housing by pressure differential such vaporized lubricating oil as may leak into or be formed in the oil-seal; second conduit means, extending from the lower part of the oil-seal to a point of discharge, for conveying away from the oil-seal such oil as collects therein; and third conduit means, extending from within the housing to a point of discharge for relieving built-up pressure within the housing.

2. An oil-and-vapor shaft seal according to claim 1, wherein the point within the housing, at which point the first conduit means terminates, is adjacent two intermeshing gears beyond their mesh in the direction of their disengagement.

3. An oil-and-vapor shaft-seal according to claim 1, wherein the means for conveying away such oil as collects in the oil-seal conveys this oil into the interior of the housing, and includes a trap, whereby to prevent vaporized lubricating oil from escaping from the housing into and through the oil-seal.

References Cited in the file of this patent

UNITED STATES PATENTS

| | | |
|---|---|---|
| 1,012,218 | Ono | Dec. 19, 1911 |
| 1,463,018 | Junggren | July 24, 1923 |
| 1,561,076 | Heitman et al. | Nov. 10, 1925 |

UNITED STATES PATENT OFFICE

CERTIFICATE OF CORRECTION

Patent No. 2,916,312                                            December 8, 1959

Richard John Thomas et al.

It is hereby certified that error appears in the printed specification of the above numbered patent requiring correction and that the said Letters Patent should read as corrected below.

Column 2, line 3, for "he open end" read -- the open end -- line 5, for "serves to carny-off" read -- serves to carry-off --

Signed and sealed this 21st day of June 1960.

(SEAL)

Attest:

KARL H. AXLINE
Attesting Officer

ROBERT C. WATSON
Commissioner of Patents